June 26, 1934.   O. A. KRENKE   1,964,263
SPRAYING FIXTURE
Filed June 15, 1932

INVENTOR
Otto A. Krenke,
BY
ATTORNEYS

Patented June 26, 1934

1,964,263

UNITED STATES PATENT OFFICE 1,964,263

SPRAYING FIXTURE

Otto A. Krenke, Port Huron, Mich., assignor to Anker-Holth Manufacturing Company, Port Huron, Mich., a corporation of Michigan Application June 15, 1932, Serial No. 617,399

1 Claim. (Cl. 299—73)

The present invention pertains to a nozzle device to be used in connection with lawn hose and hose nozzles for sprinkling, spraying and other purposes for which lawn hose is used.

The primary objects of the present invention are to provide a fixture which permits using a hose nozzle continuously for either sprinkling or spraying, and directing the stream or spray in any direction desired continuously without the necessity of manually holding the nozzle. The fixture is equipped with a watertight, rust-resistant flexible tube having a female member at one end for receiving the end of a hose and a male member at its opposite end for receiving a conventional hose nozzle. These parts are supported upon a base in such manner that the flexible part of the fixture can be bent at will at any angle relative to the ground and will then remain in this position until changed to some other angle horizontally or vertically, or any position between.

With the above and other ends in view the invention consists in the matters hereinafter set forth and more particularly pointed out in the appended claim, reference being had to the accompanying drawing, in which Figure 1 is a side elevation of the present fixture illustrating the hose connected to one end and a conventional nozzle mounted upon the other end;

Like characters of reference are employed throughout to designate the corresponding parts.

Figure 1:
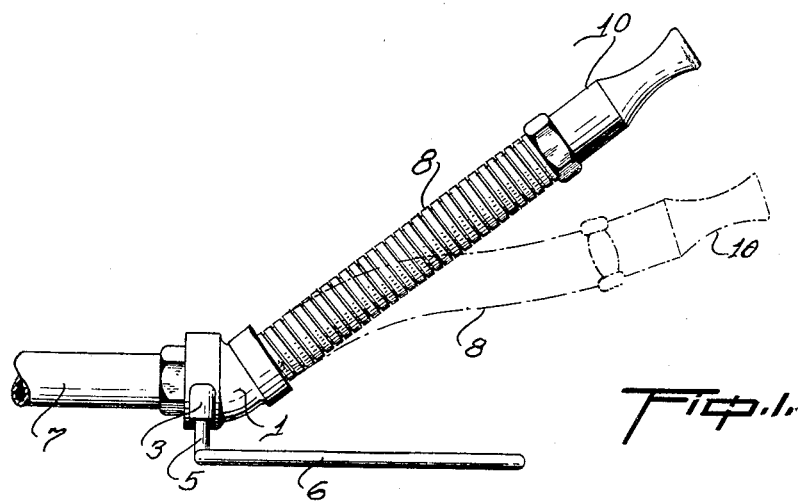
Figure 2:
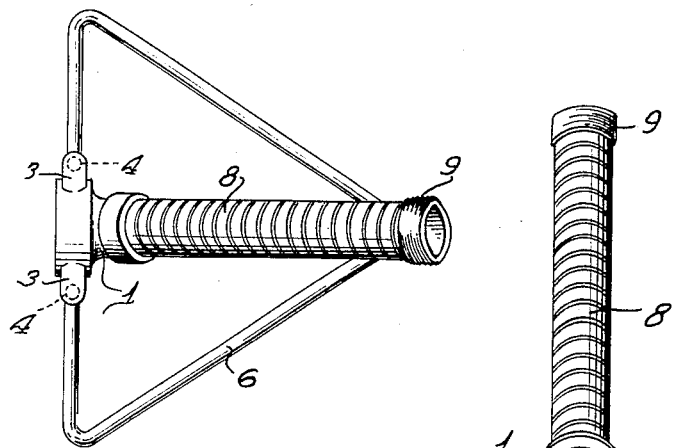
Fig. 2 is a top plan view of the fixture.
Figure 3:
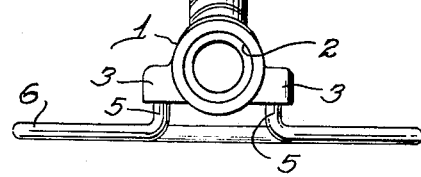
Fig. 3 is an end view of the fixture.

The numeral 1 indicates an elbow fitting having a screw-threaded opening 2 and ears 3 projecting outwardly from the sides thereof. The ears 3 are provided with suitable bores 4 which receive the upturned ends 5 of a substantially triangularly shaped base 6 which serves to hold the elbow member 1 in the position illustrated in Fig. 1 of the drawing.

A hose 7 is connected at one end to a suitable water supply and its opposite end may be connected to the present fixture by means of the screwthreaded bore 2, the opposite end of the elbow 1 supporting a flexible tube 8, preferably formed of rustproof metal so that it is waterproof and flexible. The outer end of the flexible tube is provided with a screwthreaded male member 9 onto which a conventional garden hose nozzle 10 may be conveniently attached.

The water is supplied into the elbow 1 through the hose 7 under pressure and it passes through the flexible tube member 8 to the nozzle. To change the angle at which the nozzle projects the water it is only necessary to bend the flexible tubing as is illustrated by the broken lines in Fig. 1, the flexible metal tube being so constructed that the back pressure exerted by the water when it is being forced through the restricted opening in the nozzle does not straighten it out as is the case in an ordinary hose.

Although a specific embodiment of the present invention has been illustrated and described it is to be understood that various changes may be made in the details of construction without departing from the spirit of the invention, and such changes are contemplated.

What I claim is:

A device of the character described comprising a hollow body, said body having an inlet port and an outlet port disposed with their axes at an angle relative to each other, said inlet being adapted to be connected to a hose for supplying water under pressure, said body having integral outwardly extending lugs, said lugs having bores therein, a ground engaging base having upwardly extending portions received in said bores and supporting said body with the axis of said inlet in a horizontal plane and the axis of said outlet inclined at an acute angle relative to a horizontal plane, and a flexible metallic tube secured in said outlet and adapted to receive a spray nozzle at its outer end.

OTTO A. KRENKE.